(12) United States Patent
Szablewski

(10) Patent No.: US 7,703,847 B2
(45) Date of Patent: Apr. 27, 2010

(54) BACKREST FOR A VEHICLE SEAT

(75) Inventor: Piotr Szablewski, Wuppertal (DE)

(73) Assignee: Brose Fahrzeugteile GmbH & Co. Kommanditgesellshaft, Hallstadt, Hallstadt (DE)

( * ) Notice: Subject to any disclaimer, the term of this patent is extended or adjusted under 35 U.S.C. 154(b) by 0 days.

(21) Appl. No.: 11/899,937

(22) Filed: Sep. 7, 2007

(65) Prior Publication Data

US 2008/0129100 A1  Jun. 5, 2008

Related U.S. Application Data

(63) Continuation of application No. PCT/EP2006/002080, filed on Mar. 7, 2006.

(30) Foreign Application Priority Data

Mar. 8, 2005 (DE) ............ 10 2005 010 594

(51) Int. Cl.
*B60N 2/48* (2006.01)

(52) U.S. Cl. ............ 297/216.14; 297/216.12; 297/410

(58) Field of Classification Search ............ 297/216.1, 297/216.12, 216.14, 410
See application file for complete search history.

(56) References Cited

U.S. PATENT DOCUMENTS

| 4,645,233 | A | * | 2/1987 | Bruse et al. ............ 280/801.2 |
| 5,684,701 | A | | 11/1997 | Breed et al. |
| 5,694,320 | A | * | 12/1997 | Breed ............ 701/45 |
| 5,748,473 | A | * | 5/1998 | Breed et al. ............ 701/45 |
| 5,822,707 | A | | 10/1998 | Breed et al. |
| 5,848,661 | A | | 12/1998 | Fu et al. |
| 5,924,755 | A | * | 7/1999 | Muller ............ 296/65.01 |
| 6,042,145 | A | * | 3/2000 | Mitschelen et al. ........ 280/735 |
| 6,402,195 | B1 | | 6/2002 | Eisenmann et al. |
| 7,232,187 | B1 | * | 6/2007 | Sundararajan et al. ...... 297/410 |
| 7,448,677 | B2 | * | 11/2008 | Sakai et al. ............ 297/216.12 |
| 7,484,797 | B2 | * | 2/2009 | Akaike et al. .......... 297/216.12 |
| 7,614,690 | B2 | * | 11/2009 | Matsubayashi et al. 297/216.12 |
| 7,618,091 | B2 | * | 11/2009 | Akaike et al. .......... 297/216.12 |
| 2008/0288143 | A1 | * | 11/2008 | Smith et al. ............ 701/49 |
| 2009/0243354 | A1 | * | 10/2009 | Farquhar et al. ....... 297/216.12 |

FOREIGN PATENT DOCUMENTS

| DE | 197 31 053 A1 | 1/1999 |
| EP | 1375246 A | 1/2004 |
| GB | 2 383 530 A | 7/2003 |

* cited by examiner

*Primary Examiner*—Joseph F Edell
(74) *Attorney, Agent, or Firm*—Alix, Yale & Ristas, LLP

(57) ABSTRACT

The invention relates to a backrest for a vehicle seat, with a head support (1) which is adjustable in terms of the height of the head support (1) with respect to the backrest, and with a proximity sensor (5) for detecting the head position of a person sitting on the vehicle seat in relation to the head support (1), an indication for adjusting the head support (1) in the event of a mispositioning and/or an adjustment of the head support (1) by an electric drive (4) out of an initial position taking place until the head of the person sitting on the vehicle seat causes a triggering of the proximity sensor (5), the proximity sensor (5) being arranged in the upper part of the head support (1) and being directed downward onto the region of greatest curvature of the back of the head of the person sitting on the vehicle seat.

19 Claims, 2 Drawing Sheets

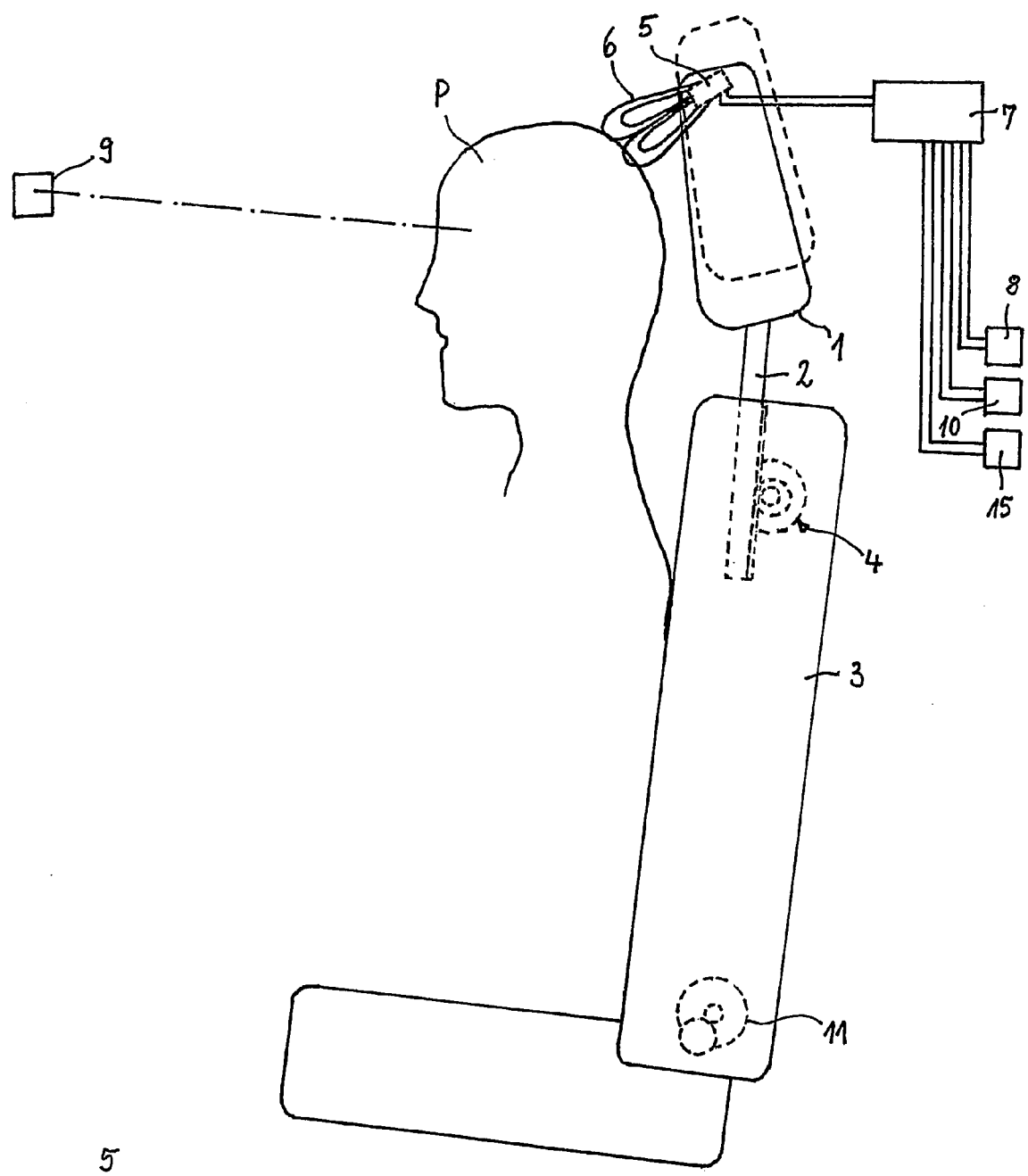
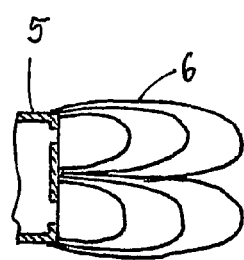
Fig. 1
Fig. 2

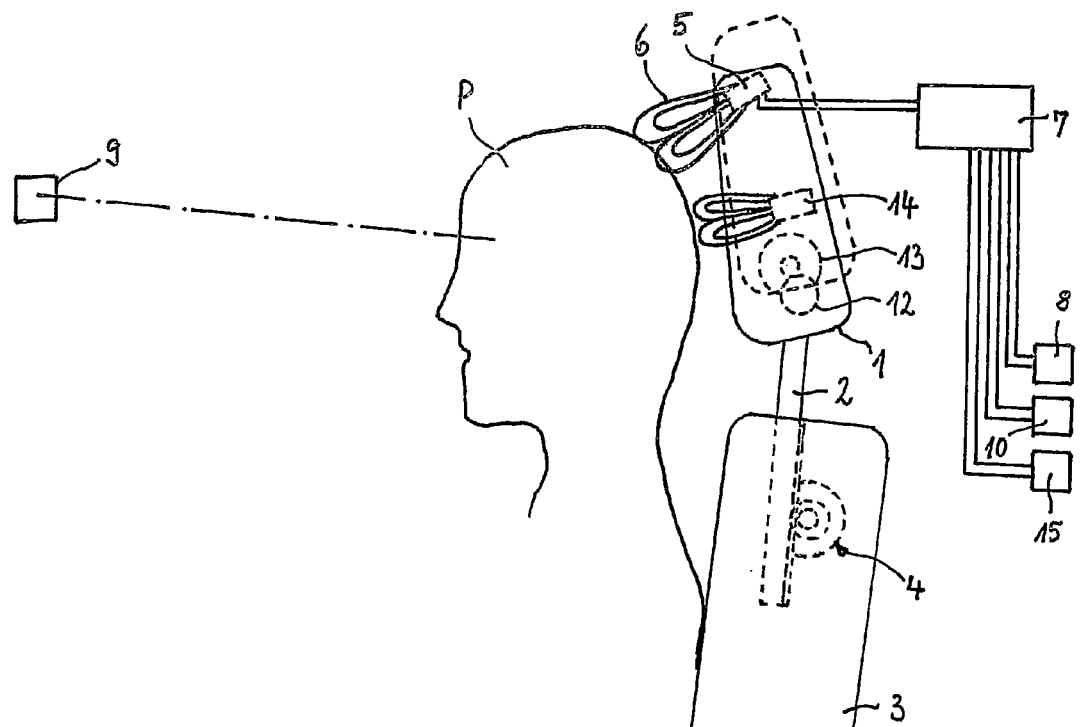
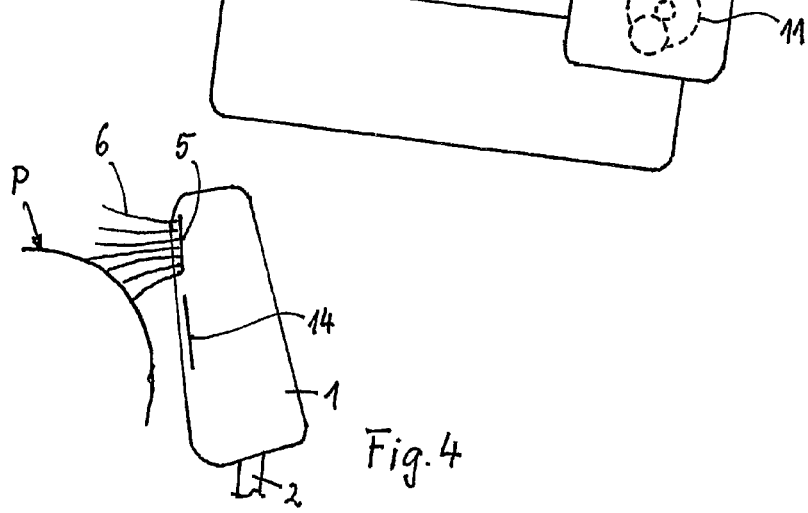

BACKREST FOR A VEHICLE SEAT

This is a Continuation of International Application No. PCT/EP2006/002080, filed Mar. 7, 2006, designating the U.S. under 35 USC §§120 and 365(c), which claims priority from German Application No. 10 2005 010 594.7 filed Mar. 8, 2005 under 35 USC §119.

BACKGROUND

The present invention relates to a backrest for a vehicle seat.

DE 199 16 804 C1 discloses a head support for a backrest of a vehicle seat, comprising a capacitive sensor with two capacitor plates which are arranged one above the other and are part of a capacitor, the dielectric of which is formed by the head of a person located on the vehicle seat. The head support can in this case be moved upward, according to the output signal from the sensor, out of a lower initial position sitting on the backrest. It is in this case assumed that the head support is aligned correctly with the person's head when the signal emitted by both capacitor plates is identical. This, however, is true only of a specific ideal head shape which is in no way always to be encountered. Thus, there are people with more or less pronounced backs of the head or with necks of greater or lesser thickness. The adjustment of the head support is more or less faulty, depending on this.

SUMMARY

The object of the invention is to provide a backrest for a vehicle seat which makes it possible to have an improved setting of the head support.

Accordingly, a backrest for a vehicle seat is provided with a head support which is adjustable in terms of the height of the head support with respect to the backrest, and with a proximity sensor for detecting the head position of a person sitting on the vehicle seat in relation to the head support, an indication for adjusting the head support in the event of a mispositioning and/or an adjustment of the head support by means of an electric drive out of an initial position taking place until the head of the person sitting on the vehicle seat causes a triggering of the proximity sensor. The proximity sensor is arranged in the upper part of the head support and is directed downward onto the region of greatest curvature of the back of the head of the person sitting on the vehicle seat or with respect to the front side of the backrest.

It thereby becomes possible for the head support to move down out of its upper moved-up initial position until the proximity sensor in the upper part of the head support detects the user's head which is normally at a distance from the head support, but, in specific situations, may also bear against the head support. Irrespective of the latter, the head is first detected by the proximity sensor, for example, in the region of the hole in the back of the skull, specifically, because of the relatively low touch-contact field curvature of this sensor, within a correspondingly small range, and the downward movement of the head support is stopped correspondingly, so that the latter is positioned in terms of height as optimally as possible with respect to the head independently of any head shape or neck shape.

If the head support is not movable electromotively, but only manually, the false positioning of the head support is indicated by an indicator, so that the person sitting on the vehicle seat can himself carry out the setting until the proximity sensor responds and the indicator is consequently extinguished.

It is expedient, moreover, if the head support is arranged at an inclination to the head. As a result, in the event of a rear collision, an upward movement of the person on account of a rearward distortion of the seat is not assisted, but, instead, is impeded.

If the head support is advantageously additionally pivotable about a horizontal axis with respect to the backrest, it is expedient to arrange in the middle part of the head support a further proximity sensor, the output signal of which can be used for adjusting the inclination of the head support until an optimal distance between head and head support is reached. The optimal distance of the head from the head support can thereby be set by the latter being pivoted until a predetermined optimal distance between head support and head is set. Moreover, this results in a corresponding inclination of the head support with respect to the head which is more advantageous in the event of a rear collision.

BRIEF DESCRIPTION OF THE DRAWING

A more detailed disclosure is set forth below with reference to the accompanying diagrammatic depictions of exemplary embodiments, wherein FIG. 1 shows diagrammatically an embodiment of a backrest with a head support of a vehicle seat;

FIG. 2 shows a sensor field of a capacitive proximity sensor in section;

FIG. 3 shows diagrammatically a further embodiment of a backrest with a head support of a vehicle seat; and FIG. 4 shows diagrammatically a detail of an additional embodiment.

DETAILED DESCRIPTION

In the embodiment illustrated in FIG. 1, a head support 1 is mounted and guided height-adjustably in a backrest 3 of a vehicle seat, for example of a motor vehicle seat, via guide rods 2 by means of an electric drive 4. A person P leans with his back against the front side of the backrest 3, while, ideally, the head of the person P is to be located, with its region nearest the head support 1, approximately in the middle of the head support 1 and at an optimal distance from this, that is to say so as not to bear against it. Expediently, in this case, the head support 1 is arranged so as to be inclined in the direction of the head of the person P sitting on the seat or toward the front side of the backrest 3.

In the upper front part of the head support 1, that is to say the part facing the head, a capacitive proximity sensor 5 is arranged, having a sensor field 6 which is directed obliquely downward onto the region of greatest curvature of the back of the head (region approximately around the hole in the back of the skull, above the height of the eyes) of the person P sitting on the seat. The sensor field 6 possesses a curvature which is substantially greater than that of the head in the region to be detected, so the response range is narrow. The proximity sensor 5 is connected to a control 7 which is accommodated, for example, in the backrest 3 or in the head support 1 or even elsewhere and by means of which the electric drive 4 can be activated correspondingly.

In order to set the head support 1 individually to a person taking a seat, as a rule, an activation switch 8 is to be actuated, since, if the user is unchanged, a renewed setting is not required. Activation causes a movement of the head support 1 into the upper initial position or maximum height (illustrated by dashes in FIG. 1), if it is not already there. Thereafter, the adjustment of the head support 1 out of the upper initial position is carried out by a downward movement until the proximity sensor 5 responds to the region of greatest curvature of the back of the head which is detected first by the proximity sensor 5. The height adjustment of the head support 1 is terminated at this point for the final or end position.

Where a capacitive proximity sensor is concerned, normally, as illustrated in FIG. 2, a sensor field 6 is with returning field lines obtained, which is approximately lobe-shaped in section. Since the sensor field of the proximity sensor 5 (or its lobes) possesses a curvature which is high in relation to the curvature of the back of the head of a person P, the height of the head position can be detected very accurately and the height of the head support 1 can be set correspondingly.

If the proximity sensor 5 does not switch during the vertical movement of the head support 1, that is to say does not detect the head of a person P, the head and/or the backrest 3 are/is in an obviously unfavorable inclination position. For the former instance, an (indicator) element 9 to be looked at by the person P may be provided, for example in the rear-view mirror region of the driver's seat in a motor vehicle, in order to bring the head into a corresponding position. For the second instance, an indicator may be provided which signals to the person P that he must adjust the backrest 3 correspondingly by hand or via the actuation of a switch (touch-contact switch) 10 for an electromotive drive 11, and/or an automatic motor adjustment, controllable via the control 7, of the backrest 3 may be provided, until the head can be detected by the proximity sensor 5.

In the event that the inclination of the head support 1 is not adjustable, it is in any event advantageous if it is arranged so as to be inclined toward the front side of the backrest 3 and therefore toward the head.

In the event that the head support 1 is adjustable only manually, the element 9 can be used as an indicator element for an inappropriate positioning of the head support 1, said element indicating this until the proximity sensor 5 responds and consequently the head support 1 is set at the correct height.

As a rule, however, the head support 1 is adjustable additionally about a horizontal axis 12 in its inclination with respect to the backrest 3 by means of an electromotive drive 13, cf. FIG. 3 (this embodiment differing only to that extent from that of FIG. 1). It is then expedient if, as likewise illustrated in FIG. 3, a second capacitive proximity sensor 14 is provided approximately in the middle of the head support 1, said proximity sensor serving for checking the distance of the head support 1 from the head and for setting it to an optimum. This takes place expediently from an inclined position of the head support 1 in which the latter bears against the head, in that the inclination is changed with respect to the backrest 3 in such a way that an optimal distance between the front side of the head support 1 and the head is established.

Instead of an adjustment of the inclination of the head support 1, a translational adjustment of the latter in the direction away from the head or toward the head of the person P may also be capable of being carried out.

Whereas, expediently, in the proximity sensor 5, the rising edge of its switching signal is used, that is to say proximity to the head until a predetermined distance is reached is used for switching, in the proximity sensor 14 the falling edge of its switching signal is preferably used, that is to say the head support 1 is moved away from the head until the proximity sensor 14 no longer detects the latter within a predetermined distance range and therefore switches.

An optimal setting of the headrest 1 can take place via the control 7 in such a way that both the height and the distance from the head are, if appropriate, optimized iteratively independently of the position of the backrest 3 (but insofar as the inclination of the latter allows setting at all).

As in the embodiment illustrated in FIG. 4, instead of capacitive proximity sensors 5, 14 having two capacitor plates being provided, as in the previous embodiment, at least one of these may be used with only one capacitor plate and therefore with a stray field as a sensor field.

If appropriate, a memory switch 15, for example in the form of a touch-contact switch, may also be provided, which, after an 'extraneous use' of the seat, makes it possible to return the seat setting to a stored position.

In particular, capacitive sensors are preferred as proximity sensors 5, 14, but, for example, inductive sensors or the like may also be used. Preferably, identical proximity sensors 5, 14 are employed. Moreover, the proximity sensor 14 is set back correspondingly, as compared with that face of the head support 1 which faces the head, so as not to endanger the head in the event of an impact of the latter.

In a motor vehicle, for example, the sitting position may be changed during a lengthy trip. So that this does not basically lead to a change in the setting of the head support 1, it may be expedient if changes, caused thereby, in the signals from the proximity sensors 5, 14 lead to a reaction by the control 7 only after a predetermined time has elapsed.

The backrest 3 may, if appropriate, also be divided horizontally, in which case the two parts, the upper of which carries the head support 1, may be adjustable with respect to one another in inclination.

The invention claimed is:

1. A backrest with head support for a vehicle seat, comprising:
    a substantially upright backrest;
    a head support mounted in the backrest and adjustable in height with respect to the backrest from a preestablished initial position to a final position commensurate with the height of the head of a person sitting in the vehicle seat, said head support having upper and lower portions;
    a capacitive proximity sensor arranged in the upper portion of the head support and having a sensing field directed obliquely downward to be triggered by the upper portion of the back of the person's head;
    wherein said upper portion of the back of the person's head has a curvature and said sensing field has a curvature which is greater than that of said upper portion of the person's head;
    an indicator responsive to a proximity signal from the proximity sensor dependent on the proximity of said upper portion of the person's head to the upper portion of the head support; and
    means for adjusting the height of the headrest to a final position at which said proximity signal is triggered.

2. The backrest as claimed in claim 1, wherein in said final position the upper portion of the head support is adjacent the upper portion of the back of said person's head and the lower portion of the head support is adjacent the lower portion of the back of said person's head.

3. The backrest as claimed in claim 1, wherein the proximity sensor is directed downward toward the back of the head of a person sitting on the vehicle seat, onto the region of the back of the head having the greatest curvature.

4. The backrest as claimed in claim 3, wherein said region of greatest curvature is at a height above the person's eyes.

5. The backrest as claimed in claim 4, wherein the final position is determined by a triggering of the proximity sensor commensurate with the sensing of the region of the back of the head having the greatest curvature.

6. The backrest as claimed in claim 1, wherein the initial position is at a maximum height and the head support can be moved downward out of the initial position to the final position as determined by a triggering of the proximity sensor.

7. The backrest as claimed in claim 6, wherein the head support is arranged on the backrest adjustably with respect to the head, and in a middle portion of the head support, where the head is to be nearest to the head support, a further proximity sensor is provided, the output signal from which can be used for adjusting the distance between head and head support.

8. The backrest as claimed in claim 1, wherein the head support is arranged so that the upper portion of the head support is inclined toward the head.

9. The backrest as claimed in claim 6, wherein the head support is arranged so that the upper portion of the head support is inclined toward the head.

10. The backrest as claimed in claim 1, wherein the head support is arranged on the backrest adjustably with respect to the head, and in a middle portion of the head support, where the head is to be nearest to the head support, a further proximity sensor is provided, the output signal from which can be used for adjusting the distance between head and head support.

11. The backrest as claimed in claim 10, wherein the head support is adjustable electromotively in its inclination with respect to the backrest.

12. The backrest as claimed in claim 10, wherein the head support is adjustable electromotively in height with respect to the backrest.

13. The backrest as claimed in claim 10, wherein, if the proximity sensor in the upper portion of the head support does not respond to adjustment of the head support over a range of motion, the further proximity sensor in the middle portion of the head support can be used for setting the height of the head support.

14. The backrest as claimed in claim 10, wherein the switch-off edge of the further proximity sensor can be used to terminate the setting of the distance of the head from the head support.

15. The backrest as claimed in claim 1, wherein if the proximity sensor in the upper part of the head support does not respond to adjustment of the head support over a range of motion, a second indicator indicating a necessary adjustment of the backrest can be displayed.

16. The backrest as claimed in claim 1, wherein the switch-on edge of the proximity sensor can be used for terminating the height adjustment of the head support to the final position.

17. The backrest as claimed in claim 1, wherein a memory switch is provided for relocating an earlier head support position.

18. The backrest as claimed in claim 1, wherein a renewed position change of the head support can be carried out, on the basis of a sensor signal change after adjustment, only after a predetermined time has elapsed.

19. The backrest as claimed in claim 1, wherein the proximity sensor in the upper portion of the head support possesses a response range which is narrow in relation to the size of the head.

* * * * *